United States Patent
Meyer et al.

(10) Patent No.: US 9,645,037 B2
(45) Date of Patent: May 9, 2017

(54) METHOD AND APPARATUS FOR WHEEL ASSEMBLY LATERAL FORCE MEASUREMENT

(71) Applicant: Hunter Engineering Company, Bridgeton, MO (US)

(72) Inventors: Gregory F. Meyer, St. Louis, MO (US); Patrick G. J. Callanan, St. Louis, MO (US)

(73) Assignee: Hunter Engineering Company, St. Louis, MO (US)

( * ) Notice: Subject to any disclaimer, the term of this patent is extended or adjusted under 35 U.S.C. 154(b) by 735 days.

(21) Appl. No.: 13/628,994

(22) Filed: Sep. 27, 2012

(65) Prior Publication Data
US 2013/0080077 A1    Mar. 28, 2013

Related U.S. Application Data

(60) Provisional application No. 61/540,266, filed on Sep. 28, 2011.

(51) Int. Cl.
| | | |
|---|---|---|
| G06F 19/00 | (2011.01) | |
| G01L 1/00 | (2006.01) | |
| G01M 1/04 | (2006.01) | |
| G01M 1/00 | (2006.01) | |

(52) U.S. Cl.
CPC .............. *G01M 1/045* (2013.01); *G01M 1/00* (2013.01)

(58) Field of Classification Search
CPC ....................................................... G01M 7/02
See application file for complete search history.

(56) References Cited

U.S. PATENT DOCUMENTS

| | | | |
|---|---|---|---|
| 3,948,004 A | | 4/1976 | Gruber |
| 4,112,630 A | * | 9/1978 | Brown, Jr. ............... 451/28 |
| 4,197,736 A | | 4/1980 | Barrett |
| 4,702,103 A | | 10/1987 | Wenz |
| 4,704,900 A | | 11/1987 | Beebe |
| 4,776,215 A | * | 10/1988 | Curchod ............... G01M 1/225 73/1.14 |
| 4,805,125 A | | 2/1989 | Beebe |
| 4,852,398 A | | 8/1989 | Cargould et al. |
| 4,956,995 A | | 9/1990 | Harrold et al. |
| 4,969,355 A | | 11/1990 | Doi et al. |

(Continued)

FOREIGN PATENT DOCUMENTS

EP    2793913 A1    10/2014

OTHER PUBLICATIONS

Illustration of Right Hand Rule (© 2010 Pearson Education Inc.) obtained from <http://www4.uwsp.edu/physastr/kmenning/Phys150/Lect36.html> on Sep. 15, 2015.*

*Primary Examiner* — Paul D Lee
*Assistant Examiner* — Mark Crohn
(74) *Attorney, Agent, or Firm* — Polster, Lieder, Woodruff & Lucchesi, LC (57) ABSTRACT

A vehicle wheel service system configured with a load roller assembly to apply a generally radial load to a vehicle wheel assembly during rotation, and which is configured with sensors to obtain one or more measurements of lateral forces associated with the vehicle wheel assembly during the loaded rotation, from which a quantified representation of lateral force for the tire of the vehicle wheel assembly is determined.

14 Claims, 6 Drawing Sheets

(56) References Cited

U.S. PATENT DOCUMENTS

| | | | |
|---|---|---|---|
| 5,365,786 A | 11/1994 | Douglas | |
| 5,396,436 A * | 3/1995 | Parker et al. | 700/279 |
| 5,645,465 A | 7/1997 | Vannan, III | |
| 6,035,709 A | 3/2000 | Barnette, Jr. | |
| 6,116,084 A | 9/2000 | Fischer et al. | |
| 6,139,401 A * | 10/2000 | Dunn | B24B 5/366 451/10 |
| 6,546,635 B1 | 4/2003 | Gerdes | |
| 6,581,448 B2 | 6/2003 | Kimbara et al. | |
| 6,609,074 B2 | 8/2003 | Shteinhauz | |
| 6,644,109 B2 | 11/2003 | Meinen | |
| 6,854,329 B2 | 2/2005 | Colarelli, III et al. | |
| 8,028,570 B2 | 10/2011 | Seichter et al. | |
| 8,250,915 B1 | 8/2012 | Voeller et al. | |
| 8,347,703 B2 | 1/2013 | Yurjevich et al. | |
| 2003/0061719 A1* | 4/2003 | Gerdes | G01M 1/045 33/203.13 |
| 2013/0042980 A1* | 2/2013 | Sotgiu | B60C 25/132 157/1.24 |
| 2014/0311231 A1 | 10/2014 | Braghiroli et al. | |

* cited by examiner

METHOD AND APPARATUS FOR WHEEL ASSEMBLY LATERAL FORCE MEASUREMENT

CROSS-REFERENCE TO RELATED APPLICATIONS

The present invention is related to, and claims priority from, U.S. Provisional Patent Application Ser. No. 61/540,266 filed on Sep. 28, 2011, which is herein incorporated by reference.

STATEMENT REGARDING FEDERALLY SPONSORED RESEARCH

Not Applicable.

BACKGROUND OF THE INVENTION

The present invention relates to vehicle service equipment such as is commonly utilized in vehicle repair shops, and more particularly, to vehicle service equipment such as wheel balancers and tire changing systems which have been configured to provide quantified measures of vehicle wheel assembly lateral forces.

Even when a vehicle wheel assembly, consisting of a wheel rim and a tire mounted thereon, is properly balanced, non-uniformity in the construction of the tire, as well as runout in the wheel rim itself, can cause significant vibration forces as the vehicle wheel assembly rolls over a road surface under a vehicle load. In order to reject tires having significant non-uniformity in their construction, many tire manufacturers inspect their tires on complex tire uniformity machines, such as disclosed in U.S. Pat. No. 6,116,084 to Fischer et al. The measurement procedures implemented in tire uniformity machines typically requires a load roller to be linearly pressed against the surface of a rotating tire at a precisely controlled angle (i.e. perpendicular to the tire surface). To ensure repeatable and consistent measurements, this linear actuation and controlled contact angle must be maintained across various sizes and shapes of tires, and requires a complex mechanical setup.

If a tire is found to be non-uniform in some manner, the rolling characteristics may be improved by a process in which the tire tread surface is selectively ground away. However, it is not uncommon for tires to produce vibration forces (not related to imbalance) of 20 pounds or more as they roll on a smooth road even after such a grinding procedure. Grinding procedures can also be perceived negatively by vehicle owners as they reduce the remaining tread and hence useable life of the tire.

Some vehicle wheel assemblies develop forces in the lateral (or axial) direction when rolling straight ahead on a flat road surface. This condition may cause a vehicle to steer away from a straight line. Sources of lateral forces include tire conicity, ply steer, and the combination of the two, known as total lateral force. Tire conicity may be envisioned by considering a vehicle wheel assembly to assume the shape of a truncated cone as it rolls. Based on geometry, such a configuration will always generate a force towards the apex of the cone regardless of the direction in which the vehicle wheel rotates. Thus, tire conicity is a force component which does not change direction with reverse rotation when measuring tire lateral residual forces. By definition:

$$\text{Conicity} = \frac{TLF_{CW} + TLF_{CCW}}{2}$$

where $TLF_{CW}$ is the total lateral force of the vehicle wheel assembly measured in the clockwise direction, and $TLF_{CCW}$ is the total lateral force of the vehicle wheel assembly measured in the counter-clockwise direction. Tire conicity is believed to be caused by the placement of internal tire components, such as belts off-center about the circumference of the tire, resulting in the tire having one sidewall which is stiffer than the other.

Tire ply steer lateral forces result from the influence of the plies in a tire in generating forces which can steer a vehicle from a straight line course. These forces are theorized to be related to the direction of the cords in the outermost ply, and hence, as the direction of rotation is reversed, the direction of the force generated by the outermost ply also changes. Thus tire ply steer is a force component which changes direction with reverse rotation when measuring tire lateral residual forces. By definition:

$$Plysteer = \frac{TLF_{CW} - TLF_{CCW}}{2}$$

where $TLF_{CW}$ is the total lateral force of the vehicle wheel assembly measured in the clockwise direction, and $TLF_{CCW}$ is the total lateral force of the vehicle wheel assembly measured in the counter-clockwise direction.

Other lateral forces which may be measured include the peak-to-peak lateral force variation, the lateral first harmonic force variation, as well as other higher lateral harmonic force variations.

The variations in radial and lateral forces during the rotation of a vehicle wheel assembly are usually caused by differences in the stiffness and/or geometry of the vehicle wheel assembly about its circumference or tread centerline. If these differences are slight, the radial and lateral force variations, and therefore the degree of tire conicity, will be insignificant and their effects unnoticeable when the vehicle wheel assembly is installed on a vehicle. However, when these differences reach a certain level, the radial and/or lateral force variations may be significant enough to cause rough riding conditions and/or difficult handling situations. Furthermore, an excessive tire conicity value will cause a rolling tire to pull to one side.

Conditions such as tire conicity and ply steer cannot be corrected during the balancing of a vehicle wheel assembly by the attachment of balancing weights. Temporary corrections to such conditions can be made by altering the shape of the tire through the use of grinding machines and the removal of tire tread material from specifically identified regions on the tire. Examples of such systems are shown in U.S. Pat. No. 3,948,004 to Gruber, U.S. Pat. No. 4,112,630 to Brown, Jr. and U.S. Pat. No. 5,645,465 to Vannan, III. However, such operations do not result in a long-term solution to the effects of lateral forces, and may result in shortened tire life as the remaining tire tread wears.

Information identifying or quantifying the measurement of lateral force present in a rotating vehicle wheel assembly is useful to automotive service personnel, consumers, and tire manufacturers. Such information may be utilized to diagnose vehicle handling problems, to recommend placement positions for a vehicle wheel assembly on a vehicle, and to facilitate quality control and/or tire warranty services.

Accordingly, it would be advantageous to provide a vehicle service system, such as a tire changer or a wheel balancer, with a measurement method which is capable of providing a quantifiable measure of the lateral forces present in a rotating vehicle wheel assembly, without the need for a complex mechanical measurements system employing precisely aligned and linearly actuated load rollers.

BRIEF SUMMARY OF THE INVENTION

In one embodiment, the present invention sets forth a method for providing a quantitative measure of the lateral force present associated with a rotating vehicle wheel assembly. The vehicle wheel assembly to be measured, consisting of a rim with a tire mounted thereon, is secured to a suitable vehicle service system, such as a vehicle wheel balancer or vehicle tire changing system. The vehicle service system is operated to engage a load roller with the tire surface to obtain a first measure of the lateral force exerted by the vehicle wheel assembly as the assembly is rotated about an axis of rotation while a load is applied to the tire surface. Once the first measurement is acquired, the vehicle wheel assembly is altered by demounting the tire from the wheel rim, reversing the tire orientation, and remounting the tire to the wheel rim in the reversed orientation. The vehicle service system is then operated to obtain a second measure of the lateral force exerted by the vehicle wheel assembly as the assembly is rotated about an axis of rotation while a load is applied to the tire surface. The first and second measured lateral forces are then processed, to obtain an value representative of the lateral force exerted by the vehicle wheel assembly. It will be recognized that the measured lateral forces may include a component of lateral force exerted by the wheel rim, however, wheel rim lateral forces are considered de minimis relative to the lateral forces exerted by the tire. As such, a measure of lateral force for a wheel assembly will be understood to be representative of the measure of lateral force exerted by the tire component.

In a next embodiment, the present invention provides a vehicle service device, such as a vehicle wheel balancer or a vehicle tire changing system, which includes a shaft adapted for receiving a vehicle wheel assembly, a rotation sensor assembly for measuring rotation of the shaft about its longitudinal axis, and a motor operatively connected to the shaft for rotating the shaft about its longitudinal axis, thereby to rotate the vehicle wheel. A load roller is further provided which is controlled to move into position to apply a generally radial force to a vehicle wheel assembly mounted on the shaft. At least one force sensor is provided which measures forces exerted by the vehicle wheel assembly in the lateral (axial) direction as the load roller is in contact with the vehicle wheel assembly circumferential surface. A display is provided to present the operator with a visual indication of the measured forces exerted by the vehicle wheel assembly during rotation, which are stored in a memory. A processor associated with the vehicle service device to control the various components and receive signals from the sensors is configured with suitable software instructions to evaluate a set of measured forces, together with calibration factors accounting for wheel dimensions and load roller position and force, to identify an value of lateral force associated with the vehicle wheel assembly.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Figures 1, 2:
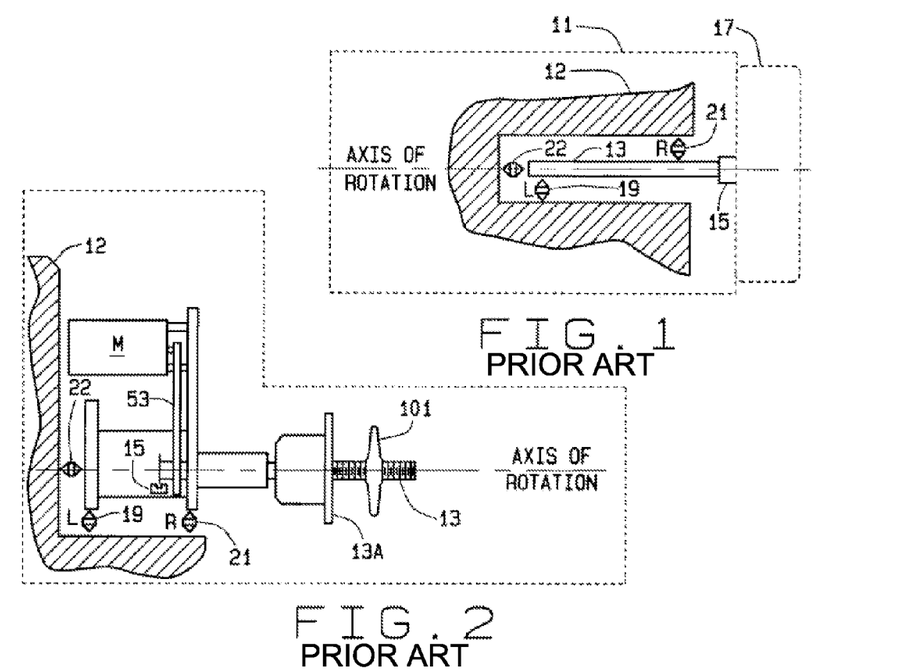
FIG. 1 is a diagrammatic view illustrating a prior art wheel balancer suitable for use with the present invention.
FIG. 2 is a simplified top plan view of the prior art wheel balancer of FIG. 1.
Figure 3:
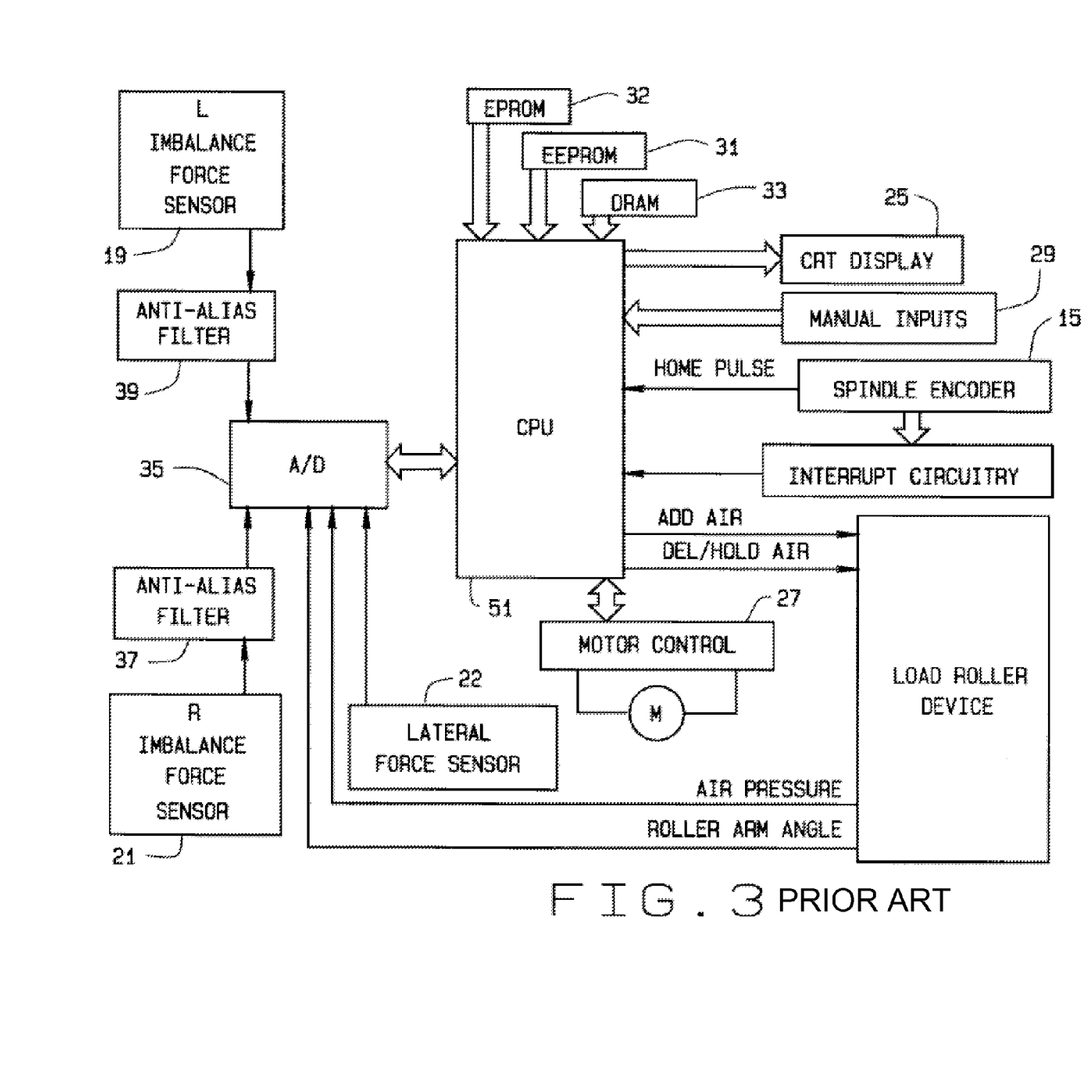
FIG. 3 is a block diagram illustrating exemplary circuitry of the prior art wheel balancer of FIGS. 1 and 2.

Turning to the drawings, FIGS. 1-4 illustrate, in simplified form, the mechanical aspects of a prior art vehicle wheel service system, and in particular, a prior art wheel balancer 11. Balancer 11 includes a rotatable shaft or spindle 13. Rotation of the spindle 13 may be driven by any suitable drive mechanism, such as a direct current electric motor M, associated motor control circuits 27, and drive belt 53, as seen in FIGS. 2 and 3. Alternatively, a freely rotating spindle 13 may be rotationally driven by applying a driving force to a wheel assembly 17 securely mounted on the spindle from a rotationally driven load roller (not shown) in engagement with the wheel assembly outer peripheral surface. Mounted on the spindle 13 is a conventional shaft encoder 15 which provides speed and rotational position information to the circuitry of FIG. 3.

During the operation of wheel balancing, at the end of spindle 13, a vehicle wheel assembly 17 under test is removably mounted for rotation with the spindle hub 13A and secured by a locking nut 101 or other suitable means. Commands may be manually input by an operator through a suitable interface 29, and results presented on a display 25. To determine the vehicle wheel imbalance, the balancer includes several force sensors 19, 21, and 22, such as piezoelectric or other suitable strain gauges, mounted on the balancer structure 12 and positioned to record forces generated by the spindle 13. Additional sensors 88 and 97 may be provided for measuring the axial and radial runout of the inside and outside rims of the wheel at the bead seats.

Turning to FIG. 2, it can be seen that the actual construction of the mechanical aspects of the balancer 11 can take a variety of forms. For example, spindle 13 can include the hub 13A against which the vehicle wheel assembly 17 abuts during the balancing procedure. Moreover, the sensors 19, 21, and 22 need not directly contact the spindle 13. For example, various arms or rods as shown in FIG. 2 can be used to mechanically couple the sensors to the spindle so that they are exposed to the vibrations and/or forces of the spindle.

When the vehicle wheel assembly 17 is unbalanced, it vibrates in a periodic manner as it is rotated, and these vibrations are transmitted to the spindle 13. The sensors 19, 21, and 22 are responsive to these vibrations of the spindle 13. Specifically, the sensors generate a pair of analog electrical signals corresponding in phase and magnitude to the vibrations of the spindle at the particular transducer locations. These analog signals are passed through appropriate filters 37, 39 and an analog-to-digital converter 35, before being communicated to the processor or CPU 51 which is configured with suitable program instructions to determine the required magnitudes and positions of correction weights to correct the imbalance. Program instructions as well as determined results may be stored in suitable data stores 31, 32, and 33 operatively coupled to the processor or CPU 51. The operations of the various components described above, and the balancer 11 in general, are fully described in U.S. Pat. Nos. 5,365,786 and 5,396,436, the disclosures of which are incorporated herein by reference. It should be understood that the above description is included for completeness only, and that various other circuits could be used instead.

Figure 4:
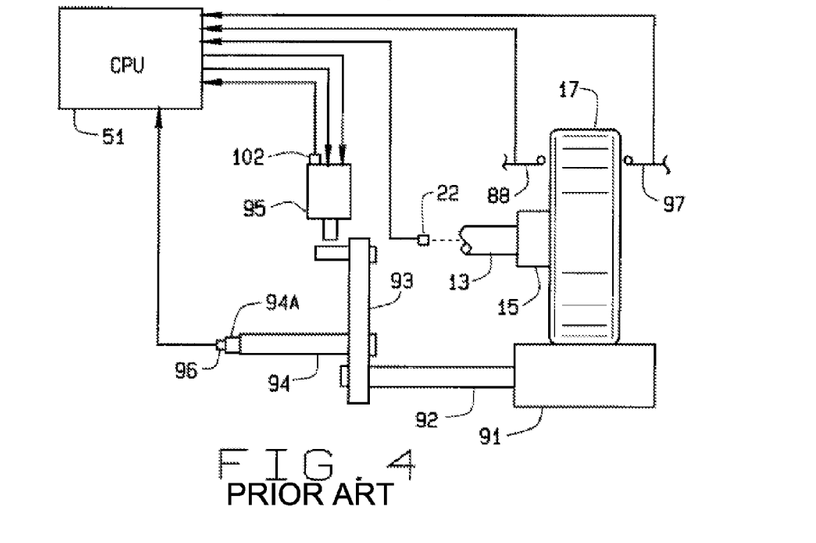
FIG. 4 is a simplified block plan view illustrating the use of a prior art balancer with a load roller and various measuring devices.

Turning to FIG. 4, there is shown a load roller 91 suitably disposed adjacent the vehicle wheel assembly 17 so that it may be displaced into engagement with a tire of the vehicle wheel assembly to measure various loaded forces. More specifically, the load roller 91 is carried on a shaft 92 suitably journaled on an L-shaped arm 93 (only the lower limb of which is clearly visible in FIG. 4) designed to pivot about the axis of a shaft 94. The central processing unit (CPU) 51 of the balancer 11 directs movement of the arm to pivot the load roller into engagement with the vehicle wheel by actuating an air cylinder 95 or an air bag actuator. Air pressure to cylinder 95 can be variably adjusted by CPU control. Air pressure feedback is provided by a sensor 102. The feedback enables precise load roller forces to be generated and provides a safety feature in that the CPU can detect pressure problems and remove air pressure if needed. For the exemplary configuration shown in FIG. 4, rotation of the shaft 94 (specifically, rotation of a magnet 94A mounted on shaft 94) is detected by a sensor 96 such as a Hall-effect sensor, and the amount of rotation is signaled to the CPU 51. Alternatively, the load roller may be configured to be moved into contact with the tire along a linear slide or linkage system, and the force applied to the tire may be measured directly using any number of suitable load sensing sensors such a strain gauge load cell. It will be recognized that a variety of different movement mechanisms may be employed to bring the load roller into contact with the tire, and that various sensors may be employed to monitor the associated load. It will further be recognized that other vehicle wheel service systems, such as a vehicle tire changing system, can be similarly configured with a load roller 91 in much the same fashion as described above, and/or that the load roller 91 may be rotationally driven by a suitable drive mechanism to provide a driving rotational force to the wheel assembly 17 when in engagement there with.

Figure 5:
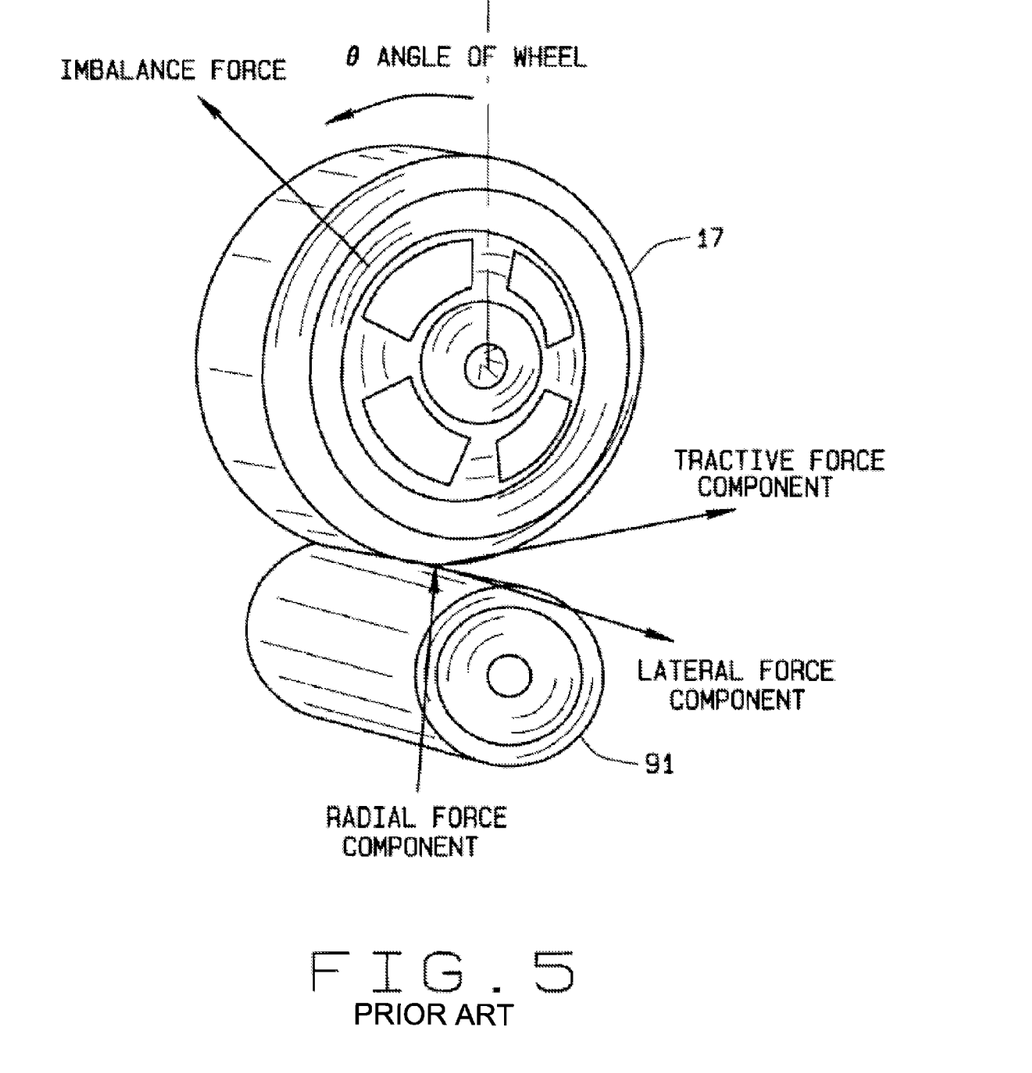
FIG. 5 is a perspective prior art view illustrating force components involved in balancing a vehicle wheel assembly.

Due to non-uniform construction, a vehicle tire can have a non-zero lateral force component, as seen in FIG. 5. When a vehicle wheel with this condition is mounted on the front of a vehicle, there is a tendency for the vehicle to steer away from a straight line when driven on a flat road. By including at least one force sensor 22 which is responsive to lateral forces exerted parallel to the axis of the vehicle wheel during rotation, these lateral forces can be measured, compared to stored specifications, as well as displayed to an operator by the CPU 51. Alternatively, the CPU 51 may be placed in communication with one or more additional vehicle service devices via a network or a direct connection to communicate the lateral force measurements to such systems for use in further vehicle service procedures. Additional vehicle service devices may include, but are not limited to, vehicle wheel alignment systems or vehicle tire changers.

The third additional force sensor 22 may be disposed adjacent the shaft 13, to detect lateral forces along or parallel to the axis of the vehicle wheel which are transmitted by the shaft 13 during rotation. Alternatively, the third additional force sensor 22 may be disposed adjacent the shaft 92, upon which the load roller 91 is mounted, to detect lateral forces along or parallel to the axis of the load roller 91 which are transmitted by the shaft 92. The third additional force sensor 22 may be a conventional strain gauge, or the like, or may be a ring-shaped force transducer placed between the rotating load roller 91 and a bearing surface securing shaft 92 in place. Other types of force or displacement sensors could also be used.

Lateral forces measured by the third force sensor 22 positioned adjacent the spindle shaft 13 vary from lateral forces measured when the third force sensor 22 is positioned adjacent the load roller shaft 92. The degree of variation between lateral forces measured in these two locations is due, in part, to the characteristics of the vehicle wheel assembly under test. Specifically, as the vehicle wheel assembly is rotated against the load roller 91, lateral and radial forces are generated at the point of contact between the vehicle wheel and the load roller 91. Lateral forces exerted on the load roller 91 may be measured by the sensor 22 positioned adjacent to the load roller shaft 92. However, if the sensor 22 is positioned adjacent the spindle shaft 13, the lateral forces exerted at the load roller/vehicle wheel interface must be first transferred through the carcass of the vehicle wheel assembly, and then through spindle shaft 13, resulting in an attenuation. The attenuation of the lateral force between the load roller/vehicle wheel interface, and the spindle shaft 13, is the result of a portion of the lateral force causing the tire carcass to flex or bend during rotation.

In an alternative embodiment, an additional force sensor may be placed to measure lateral forces along or parallel to the shaft 13, while another force sensor may be placed to measure lateral forces along or parallel to the shaft 92. By utilizing signals representative of lateral forces measured at each additional sensor during the rotation of a vehicle wheel assembly 17 against the load roller 91, the CPU 51 may be configured to identify one or more characteristics of the vehicle wheel assembly undergoing test, including a measure of an amount of flex which the tire carcass experiences during rotation.

It is known that if the rotational axis of the load roller 91 and the rotational axis of the mounted vehicle wheel assembly 17 vary from parallel even by a small amount, a perfectly uniform vehicle wheel assembly may falsely appear to have a larger average lateral force measurement when observed by force sensor 22. This critical relationship results in the inherent complexity found in the mechanical design of commercially available tire uniformity grading (TUG) machines, in order to maintain the load roller 91 parallel to the rotational axis of the mounted wheel assembly 17. However, it has been found that by measuring changes in lateral forces between different vehicle wheels, or even multiple measurements for the same wheel assembly under different conditions, meaningful quantified lateral force information can still be obtained and displayed to an operator, even if the load roller 91 and wheel mounting spindle 13 are not maintained in a precisely parallel relationship, or the load roller 91 and the wheel assembly 17 are engaged along an undefined orientation. The present disclosure specifically sets forth a method for acquiring a meaningful quantified representation of lateral forces in a vehicle wheel assembly 17 while utilizing vehicle service equipment such as vehicle wheel balancers and vehicle tire changing systems which incorporate load roller mechanisms for applying a generally radial load to an outer peripheral or circumferential surface of a spindle-mounted wheel assembly tire, but which do not necessarily ensure a known or precise parallel relationship between the load roller 91 and rotational axis of the wheel assembly 17.

For example, when moving a load roller 91 into engagement with a wheel assembly tire outer peripheral surface (i.e., generally the tread surface), the load roller axis of rotation may have a different offset or engagement orientation from the wheel assembly rotational axis when at different radial distances, such as will be found when measuring wheel assemblies 17 of different diameters. Hence, a wheel assembly 17 of a first diameter, having a known amount of lateral force, may provide a first measure of the lateral force when measured on a wheel balancer or tire changing system of the present disclosure, while a second wheel assembly 17 of a second diameter, having the same amount of known lateral force may provide a different measure of the lateral force when measured on the same vehicle service device, due to the different positioning of the load roller 91. Accordingly, it is preferred that a vehicle service system, such as a wheel balancer or tire changing system of the present invention, incorporate a calibration database capable of providing correction or calibration factors to the CPU 51 for load roller measurements acquired across a range of positions for the load roller mechanism (i.e., corresponding to different wheel assembly configuration characteristics, such as diameter, wheel offset, wheel width, and tire types). The calibration database may be maintained in a locally accessible machine readable memory, or may be stored remotely from the vehicle service system and accessed via a communications link as needed.

In a second example, when moving a load roller 91 into engagement with a wheel assembly tire outer periperhal surface, the load roller axis of rotation may have a different offset or engagement orientation from the wheel assembly rotational axis depending upon width of the tire and the wheel rim offset, such as will be found when measuring narrow wheel assemblies versus extremely wide wheel assemblies. Hence, a wheel assembly of a first offset, having a known amount of lateral force, may provide a first measure of lateral force when measured on a wheel balancer or tire changing system of the present disclosure, but a second wheel assembly with a second offset, but otherwise identical and having the same known amount of lateral force, may provide a different measure of the lateral force when measured on the same vehicle service device, due to the different engagement of the load roller 91 with the wheel assembly tire outer peripheral surface. Accordingly, it is preferred that a vehicle service system, such as a wheel balancer or tire changing system of the present invention, incorporate a calibration database capable of providing correction or calibration factors to the CPU 51 for load roller measurements acquired across a range of different wheel assembly configurations. The calibration database may be maintained in a locally accessible machine readable memory, or may be stored remotely from the vehicle service system and accessed via a communications link as needed.

Similar calibration databases may be established and maintained for other vehicle wheel assembly configuration characteristics which are found to effect the measure of lateral forces, including, but not limited to, tire sizes, tire manufacturer, tire composition, rim composition, and rim configuration.

In order to obtain a meaningful quantified representation of the lateral force of a vehicle wheel assembly 17 without using a calibration database, and using an imprecisely aligned load roller 91, i.e., a load roller which is engaging the wheel assembly tire outer peripheral surface at an orientation that is not precisely controlled to be parallel to the axis of rotation of the wheel assembly while under load, the method of the present disclosure requires that the lateral forces of the wheel assembly 17 be measured twice, once with the tire mounted to the wheel rim in a first orientation (i.e. with a first sidewall in an "outside" position relative to the wheel rim), and once with the tire remounted to the wheel rim in a second and opposite orientation (i.e. with the first sidewall in an "inside" position relative to the wheel rim). Each measurement is carried out by the same load roller mechanism engaged with the wheel assembly 17 at the same position, orientation, and force, and therefore, any contribution to the measurements by the load roller mechanism position or orientation can be mathematically cancelled to obtain a quantified representation of lateral force for the tire on the wheel assembly 17. The resulting quantified representation of lateral force can be subsequently utilized to develop calibration data for the characteristics of the particular wheel assembly configuration undergoing testing, which may be stored in a suitable calibration database.

Figure 6:
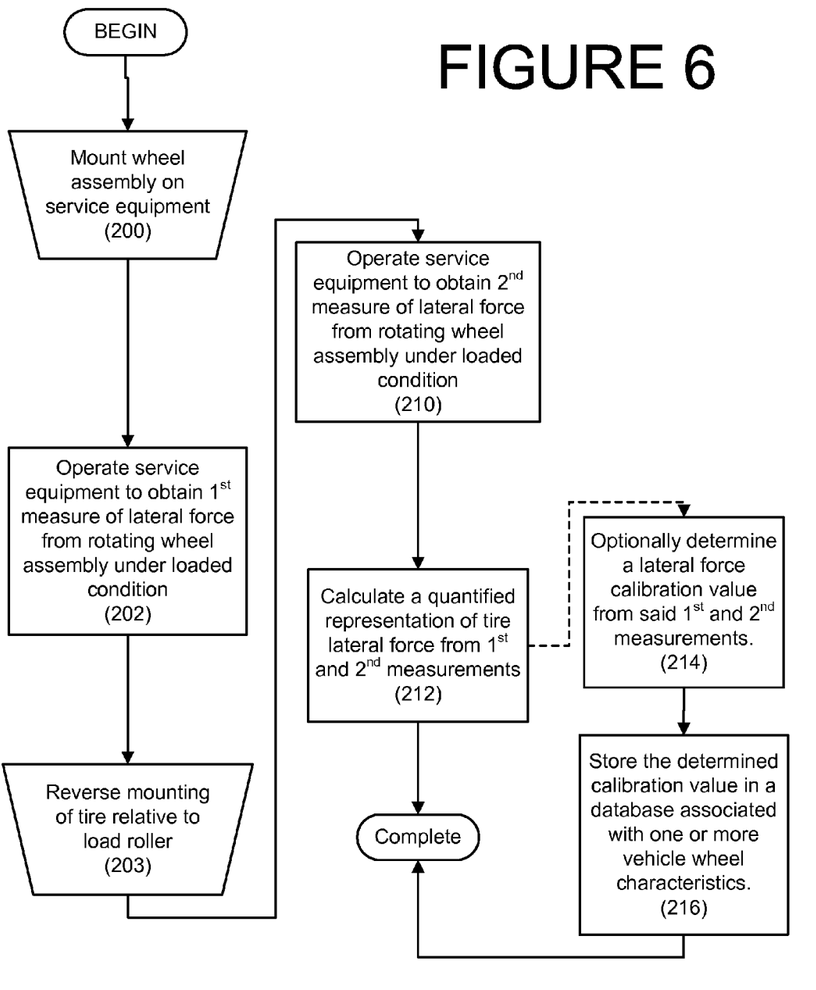
FIG. 6 is a flow chart illustrating the steps in a first method of the present invention for utilizing a vehicle service device to obtain a representation of lateral force for a vehicle tire from two measurements of lateral force.
Figure 7:
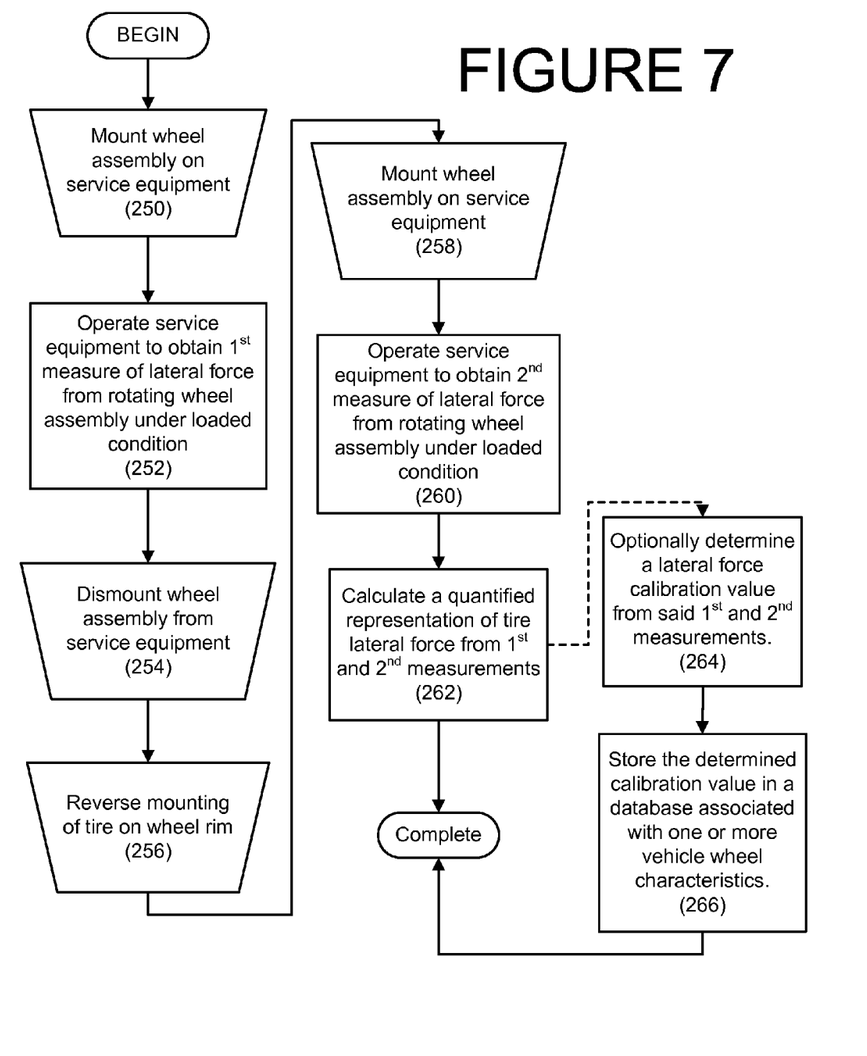
FIG. 7 is a flow chart illustrating the steps in a second method of the present invention for utilizing a vehicle service device to obtain a representation of lateral force for a vehicle tire from two measurements of lateral force.

One method for carrying out a procedure of the present disclosure is shown by the flow-charts of FIG. 6 and FIG. 7. Initially, at Box 200, 250, a wheel assembly to be measured is mounted to the vehicle wheel service equipment (such as a wheel balancer or tire changing system) in a conventional manner for rotational movement. Next, at Box 202, 252, the vehicle wheel service equipment is operated to obtain a first measurement of the lateral force exerted by the wheel assembly during rotation. This is done by positioning a load roller to apply a load to the wheel assembly tire outer peripheral or circumferential surface (i.e., generally the tire tread surface) during rotational movement of the wheel assembly, and obtaining a corresponding lateral force measurement signal from at least one suitable sensor associated with either the load roller or the spindle shaft on which the wheel assembly is mounted. Next, the mounting orientation of the tire relative to the load roller is reversed (Box 203). This may be done, for example, as shown in FIG. 7 at Box 254, by dismounting the wheel assembly from the vehicle wheel service equipment (if necessary), reversing the mounting of the tire on the wheel rim (Box 256), such that the tire sidewall adjacent to the inside face of the wheel rim is now positioned on adjacent to the outside face of the wheel rim, and vice versa, and then (if previously dismounted) remounting the wheel assembly onto the vehicle wheel service equipment (Box 258).

Those of ordinary skill in the art will recognize that for some vehicle service devices, such as tire changers, it is not necessary to dismount/remount the wheel assembly from the vehicle service device when reversing the mounting of the tire relative to the load roller. Rather, the tire may be separated from the wheel rim, which remains mounted to the vehicle service device, repositioned relative to the wheel rim, and subsequently remounted to the wheel rim. Once the tire is remounted, the vehicle wheel service equipment, at Box 210, 260, is again operated to obtain a second measurement of the lateral force exerted by the wheel assembly during rotation.

As was done previously (Box 202, 252), this is carried out by repositioning the load roller to apply the same load to the wheel assembly tire outer peripheral or circumferential surface during rotational movement of the wheel assembly, and obtaining a corresponding lateral force measurement. Once the two measurements of lateral force have been obtained, they are mathematically averaged to obtain a quantified representation of lateral force (Box 212, 262) exerted by the vehicle wheel assembly during rotation, and which is comparable to a Tire Uniformity Grade measurement obtained by the complex measurement systems commonly utilized by tire manufacturers. Since the component of lateral force contributed by the wheel rim itself is de minimis, the quantified representation of lateral force can be considered to be a representation of the lateral force of the tire itself.

Optionally, the quantified representation of the wheel assembly lateral force obtained (in Box 212, 262) may be utilized to determine a lateral force calibration value (Box 214, 264) for one or more characteristics of the vehicle wheel assembly undergoing testing. The determined calibration value may be subsequently stored (Box 216, 266) in a calibration database for subsequent retrieval and evaluation.

Those of ordinary skill in the art will recognize that while the method of the present invention illustrated by the flow chart of FIG. 7 requires that the tire be dismounted from the wheel rim and remounted in the opposite orientation (Box 254, Box 256) between subsequent measurements of the wheel assembly lateral force (Box 252, Box 260), the entire wheel assembly could simply be remounted to the vehicle service device in a reversed mounting orientation if a suitable mounting means are provided on the vehicle service device.

Figure 8:
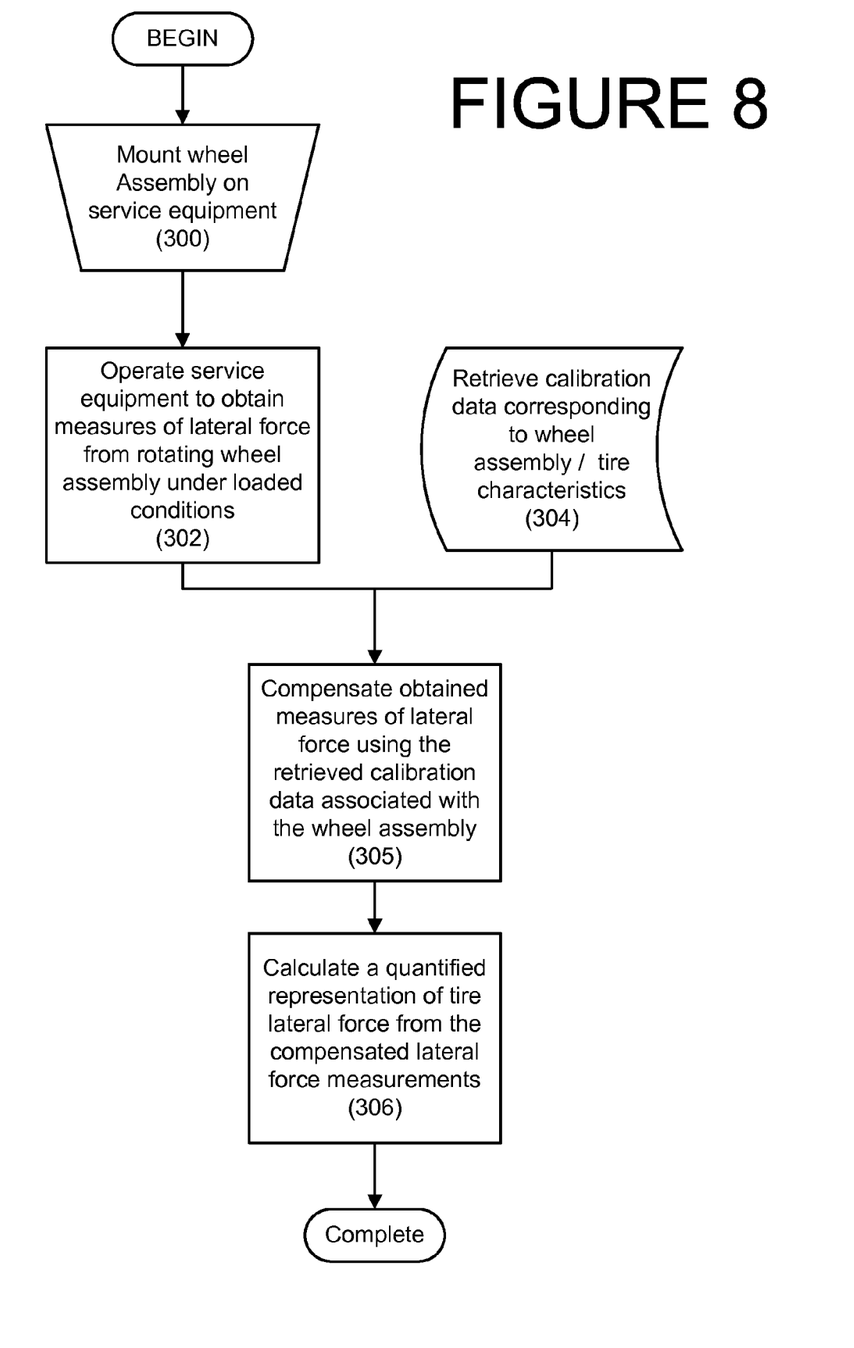
FIG. 8 is a flow chart illustrating the steps in a method of the present invention for utilizing a vehicle service device to obtain a representation of lateral force for a vehicle tire from a single measurement of lateral force compensated with stored calibration data.

A second embodiment of the present disclosure is shown by the flow-chart of FIG. 8. Initially, at Box 300, the wheel assembly (having known or determined characteristics such as diameter, width, tire type, wheel offset, etc.) is mounted to the vehicle wheel service equipment (such as a wheel balancer or tire changing system) in a conventional manner for rotational movement. Next, at Box 302, the vehicle wheel service equipment is operated to obtain a measurement of the lateral force exerted by the wheel assembly during rotation. This is done, for example, by positioning a load roller to apply a load to tire surface of the wheel assembly during rotational movement, and obtaining a corresponding lateral force measurement signal from at least one suitable sensor associated with either the load roller or the rotating spindle upon which the wheel assembly is mounted.

Measurements of a lateral force acquired during the application of a load by the load roller may vary in relation to one or more characteristic of the vehicle wheel assembly, such as the wheel diameter or wheel rim offset. Calibration data associated with various wheel assembly characteristics may be stored in a machine-readable data store accessible to the vehicle wheel service equipment and which are retrieved (Box 304) during a measurement procedure as required. The resulting measurement of lateral force, are compensated in accordance with the calibration data associated with the measured or known characteristics of the vehicle wheel assembly (Box 305) retrieved from the storage means, to determines an quantified representation of the lateral force (Box 306) for the vehicle wheel assembly/tire during rotation. The quantified representation of the lateral force is comparable to the Tire Uniformity Grade measurement obtained by the complex measurement systems utilized by tire manufacturers.

The present disclosure can be embodied in-part in the form of computer-implemented processes and apparatuses for practicing those processes. The present disclosure can also be embodied in-part in the form of computer program code containing instructions embodied in tangible media or other computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A vehicle wheel service system having a spindle shaft for rotation about an axis and adapted for receiving a vehicle wheel assembly consisting of a tire mounted to a wheel rim, a motor operatively connected to the spindle shaft for rotating the spindle shaft and wheel assembly, and a processor operatively configured to control the components of the vehicle wheel service system, comprising:

a load roller assembly supporting a load roller for rotation about a rotational axis, whereby said processor is configured to control engagement of said load roller assembly and said wheel assembly to apply a generally radial force to said vehicle wheel assembly during rotation;

at least one sensor for measuring a lateral force exerted by said vehicle wheel assembly on said load roller during rotation while said generally radial force is applied to said vehicle wheel assembly without regards as to a specific orientation between the load roller rotational axis and the vehicle wheel assembly axis of rotation; and wherein the processor is operatively configured to determine quantified representations of conicity and ply steer for the tire under loaded conditions from measures of lateral force received from said at least one sensor together with a load roller correction factor, said load roller correction factor based on a position of said load roller during application of said generally radial force to said vehicle wheel assembly.

2. The vehicle wheel service system of claim 1 wherein the processor is further configured to receive signals associated with imbalance of the vehicle wheel assembly from associated sensors, and to identify one or more imbalance characteristics of the vehicle wheel assembly from said received signals.

3. The vehicle wheel service system of claim 1 further including one or more tire mount/demount tools for the mounting and demounting of the tire on the wheel rim.

4. The vehicle wheel service system of claim 1 wherein said processor is operatively configured to determine an average of at least two lateral force measurements associated with said vehicle wheel assembly, each of said lateral force measurements acquired with said load roller engaged with said vehicle wheel assembly while said load roller rotational axis is in a repeated position and orientation with respect to the wheel assembly axis of rotation and is applying the same generally radial force.

5. The vehicle wheel service system of claim 1 wherein said position of said load roller during application of said generally radial force to said vehicle wheel assembly is associated with at least one vehicle wheel characteristic selected from a set of vehicle wheel characteristics including, tire diameters, wheel offsets, and tire widths.

6. The vehicle wheel service system of claim 1 wherein said processor is operatively configured to determine an average of at least a first lateral force measurement associated with said vehicle tire in a first mounting orientation relative to said spindle shaft, and a second lateral force measurement associated with said vehicle tire in a reversed mounting orientation relative to said spindle shaft.

7. The vehicle wheel service system of claim 6 wherein vehicle tire is mounted on said wheel rim in said first mounting orientation during acquisition of said first lateral force measurement, and wherein said vehicle tire is mounted on said wheel rim in said reversed mounting orientation during acquisition of said second lateral force measurement.

8. The vehicle wheel service system of claim 1 wherein said processor is operatively configured to store said lateral force measurements associated with the vehicle wheel assembly and/or said determined quantified representations of conicity and ply steer for the vehicle tire in an accessible data storage means.

9. The vehicle wheel service system of claim 1 wherein said at least one sensor for measuring a lateral force is configured to measure said lateral force at said rotating spindle shaft.

10. A method for determining a representation of lateral force in a vehicle tire which is part of a wheel assembly, said wheel assembly consisting of said tire mounted to a wheel rim, comprising:

mounting the wheel assembly to a spindle shaft of a vehicle service device for controlled rotational movement about an axis of rotation;

engaging the outer circumferential surface of the tire with a load roller assembly to apply a radial load to said tire;

obtaining a first measurement of wheel assembly lateral force by monitoring a lateral force produced during rotation of the wheel assembly under load about said axis of rotation;

disengaging the load roller assembly from the outer circumferential surface of the tire;

reversing the mounting orientation of the tire relative to the load roller assembly;

re-engaging the outer circumferential surface of the tire with the load roller assembly to apply said radial load to said tire;

obtaining a second measurement of wheel assembly lateral force by monitoring a second lateral force produced during rotation of the wheel assembly under load about said axis of rotation;

determining quantified representations of conicity and ply steer of the wheel assembly under load from said first and second measurements of wheel assembly lateral force;

utilizing said determined quantified representations of conicity and ply steer together with known amounts of conicity and ply steer exerted by said vehicle wheel assembly under load to establish a lateral force correction factor for the vehicle service device associated with a position of the load roller assembly when engaged with the outer circumferential surface of the tire; and storing said lateral force correction factor together with said load roller position in an accessible data store.

11. The method of claim 10 wherein said step of reversing the mounting orientation of the tire relative to the load roller assembly further includes dismounting said tire from said rim; reversing an orientation of said tire relative to said rim; and remounting said tire to said rim in said reversed orientation.

12. The method of claim 10 wherein said step of reversing the mounting orientation of the tire relative to the load roller assembly includes the step of reversing the mounting orientation of the wheel assembly on the driven spindle shaft.

13. The method of claim 10 wherein said position of the load roller assembly when engaged with the outer circumferential surface of the tire is responsive to at least one characteristic of the wheel assembly selected from a set of characteristics including a wheel assembly diameter, a wheel assembly offset, and a vehicle wheel assembly width.

14. The method of claim 10 wherein said step of determining includes the step of calculating an absolute value of an average of the first measurement of wheel assembly lateral force and the second measurement of wheel assembly lateral force.

* * * * *